United States Patent
Nadd et al.

(10) Patent No.: US 6,803,730 B2
(45) Date of Patent: Oct. 12, 2004

(54) SINGLE STAGE PFC + BALLAST CONTROL CIRCUIT/GENERAL PURPOSE POWER CONVERTER

(75) Inventors: Bruno C. Nadd, Lourmarin (FR); Vincent Thiery, Aix Ena Provence (FR); Thomas J. Ribarich, Laguna Beach, CA (US); John Ribarich, El Segundo, CA (US)

(73) Assignee: International Rectifier Corporation, El Segundo, CA (US)

( * ) Notice: Subject to any disclaimer, the term of this patent is extended or adjusted under 35 U.S.C. 154(b) by 144 days.

(21) Appl. No.: 10/103,315

(22) Filed: Mar. 20, 2002

(65) Prior Publication Data

US 2002/0191429 A1 Dec. 19, 2002

Related U.S. Application Data

(60) Provisional application No. 60/277,284, filed on Mar. 21, 2001.

(51) Int. Cl.$^7$ ............................................. H05B 37/02
(52) U.S. Cl. ................... 315/209 R; 315/291; 315/307; 315/DIG. 4
(58) Field of Search ............................. 315/209 R, 224, 315/291, 307, DIG. 4, 194, 225, 246, 247; 363/17, 98, 95

(56) References Cited

U.S. PATENT DOCUMENTS

| | | | | |
|---|---|---|---|---|
| 5,481,160 A | * | 1/1996 | Nilssen | 315/209 R |
| 5,742,132 A | * | 4/1998 | Huber et al. | 315/209 R |
| 6,246,599 B1 | * | 6/2001 | Jang et al. | 363/132 |
| 6,324,078 B1 | * | 11/2001 | Naruo et al. | 363/17 |

FOREIGN PATENT DOCUMENTS

DE     199 63 289 A1  *  12/1999

* cited by examiner

*Primary Examiner*—Tuyet T. Vo
(74) *Attorney, Agent, or Firm*—Ostrolenk, Faber, Gerb & Soffen, LLP

(57) ABSTRACT

Two switching half-bridges are operated to achieve constant power delivered to a resonant load while achieving a high power factor. A half-bridge connected to a circuit input draws a sinusoidal current that is in phase with the input voltage to achieve the high power factor. The two half-bridges are composed of two switches each, which are operated to obtain constant load power in satisfaction of calculated conduction angles. Alternatively, the switches are operated on complementary 50% duty cycles to regulate output voltage and shape the input current waveform. Output regulation is achieved by frequency control while input current wave shaping is realized by phase shifts between the two half-bridges.

4 Claims, 20 Drawing Sheets

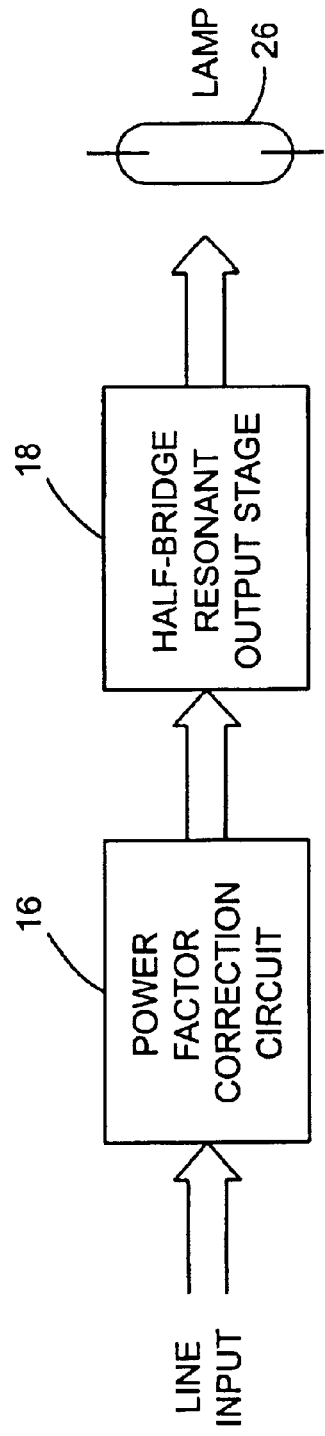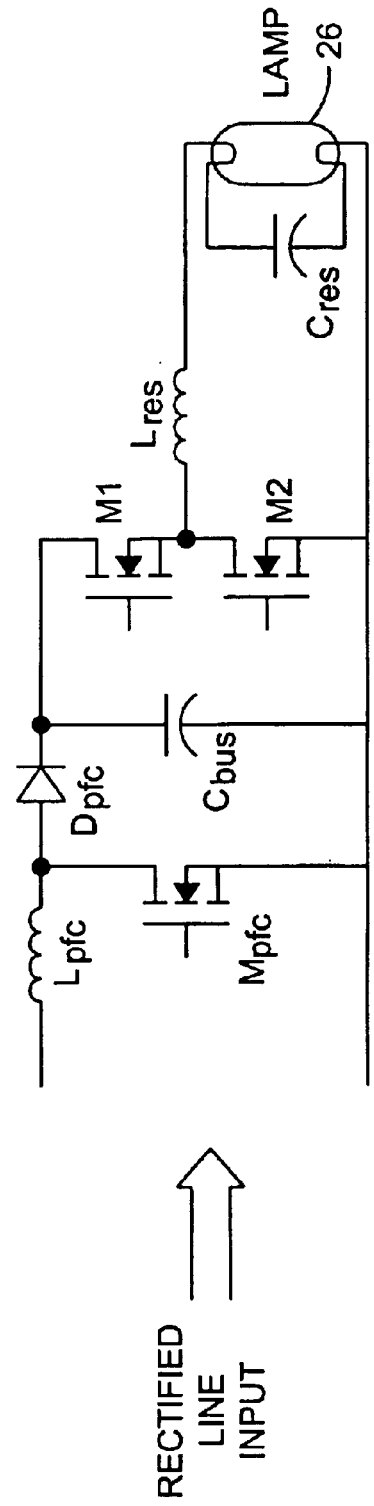

Θ=0

Θ=90

Θ=180

SINGLE STAGE PFC + BALLAST CONTROL CIRCUIT/GENERAL PURPOSE POWER CONVERTER

RELATED APPLICATION

This application is based on and claims benefit of U.S. Provisional Application Ser. No. 60/277,284, filed Mar. 21, 2001 entitled SINGLE-STAGE PFC+ BALLAST CONTROL CIRCUIT/GENERAL PURPOSE CONVERTER, to which a claim of priority is hereby made.

BACKGROUND OF THE INVENTION

1. Field of the Invention

The present invention relates generally to power converter circuits, and more specifically relates to a ballast control circuit with an integral power factor correction (PFC) circuit.

2. Description of Related Art

Ballasts have been used for many years as part of lighting systems and gas discharge lamps, and in particular for fluorescent lamps. Fluorescent lamps pose a load control problem to the power supply lines that provide lamp power, because the lamp load is non-linear. Current through the lamp is zero until an applied voltage reaches a starting value, at which point the lamp begins to conduct. As the lamp begins to conduct, the ballast ensures that the current drawn by the lamp does not increase rapidly, thereby preventing damage and other operational problems.

A type of electronic ballast typically provided includes a rectifier to change the alternating current (AC) supplied by a power line to direct current (DC). The output of the rectifier is typically connected to an inverter to change the direct current into a high frequency AC signal, typically in the range of 25–60 kHz. The high frequency inverter output to power the lamp permits the use of inductors with much smaller ratings than would otherwise be possible, and thereby reduces the size and cost of the electronic ballast.

Often, a power factor correction circuit is inserted between the rectifier and the inverter to adjust the power factor of the lamp circuit. Ideally, the load in an AC circuit should be equivalent to pure resistance to obtain the most efficient power delivery for the circuit. The power factor correction circuit is typically a switched circuit that transfers stored energy between storage capacitors and the circuit load. The typical power inverter circuit also employs switching schemes to produce high frequency AC signal output from the low frequency DC input. Switching within the power factor correction circuit and the rectifier circuit can be accomplished with a digital controller.

By controlling the switching in the power inverter circuit, operating parameters of the lamp such as starting, light level regulation and dimming can be reliably controlled. In addition, lamp operating parameters can be observed to provide feedback to the controller for detection of lamp faults and proper operational ranges.

A conventional electronic ballast circuit is shown diagrammatically in FIG. 1A. A power factor correction (PFC) circuit 16 accepts a line input and provides regulated power to an output stage 18. PFC circuit 16 provides a regulated DC bus voltage to output stage 18. Output stage 18 provides appropriate control for powering lamp 26. Output stage 18 includes the components and operational ability for preheating, igniting and regulating power to lamp 26.

PFC circuit 16 is typically realized as a boost-type converter that requires a high voltage switch, an inductor, a diode, a high voltage DC bus capacitor and an associated control circuit to produce the desired power signals with the components provided. Output stage 18 is typically realized with a half-bridge driven resonant load to provide appropriate power to lamp 26. Output stage 18 typically requires two high voltage switches, a resonant inductor, a resonant capacitor, a DC-blocking capacitor and an associated control circuit for regulating circuit resonance and power delivery. A representative circuit diagram of such a conventional circuit is illustrated in FIG. 1B.

In the conventional configuration shown in FIG. 1B, switch M1 constitutes one of the switches of the half-bridge output stage. Switch M1 is connected to a DC bus capacitor Cbus at a single mode. The PFC circuit components Lpfc, Mpfc and Dpfc are operated to charge Cbus during an initial stage, such as a power on state. Upon being charged, bus capacitor Cbus supplies power to half-bridge resonant output stage 18 for the remainder of the operation of the circuit. By supplying power to output stage 18, bus capacitor Cbus is rated for high capacitance and high voltage operation, thereby increasing the cost and size of the electronic ballast circuit. In addition, switches M1, M2 are also rated for high voltage operation, and therefore have increased cost and size as well.

Another application for the type of circuit described in FIG. 1A is for use related to power converters. The range of power converter applications include AC to DC power converters and DC to DC power converters. A conventional AC to DC power converter is illustrated in FIG. 1C. The configuration of the DC converter shown in FIG. 1C is similar to the electronic ballast circuit illustrated in FIG. 1B, but having a different load configuration. The DC converter and FIG. 1C has a power factor correction circuit composed of a high voltage switch Mpfc, an inductor Lpfc, a diode Dpfc, a high voltage DC bus capacitor Cbus and an associated PFC control circuit (not shown). The half-bridge driven resonant load includes two high voltage switches M1, M2, a resonant conductor Lres, a resonant capacitor Cres, a DC blocking capacitor Cblk and an associated control circuit (not shown) to control power delivered to transformer T1, and subsequently to load resistor RL. As with the configuration shown in FIG. 1B, bus capacitor Cbus shown in FIG. 1C is charged by operation of PFC components Lpfc, Mpfc and Dpfc. Bus capacitor Cbus then supplies all power transferred to the half-bridge resonant output stage for the remainder of the operation of the DC converter. Accordingly, bus capacitor Cbus is rated for high capacitance and high voltage operation, resulting in larger and more expensive components. Similarly, the power controlled by switching switches M1, M2 is supplied to the resonant components and output stage of the DC converter. Switches M1, M2 are therefore rated for high voltage operation, resulting again in larger and more expensive components.

SUMMARY OF THE INVENTION

The present invention breaks the connection between the line input and the bus capacitor conventionally made in prior converters and ballasts. According to this novel approach, the bus capacitor is accessible to the line input through a half-bridge and a resonant output stage connected in series. By separating the bus capacitor from the input stage, power distribution in the circuit can be achieved with a more balanced operation. In this configuration, the bus capacitor can have a very high ripple voltage, permitting the use of a non-electrolytic capacitor. By using less expensive and more reliable types of capacitors, the overall circuit becomes more reliable, less expensive, and easier to maintain.

According to the present invention, two half-bridges are used with a resonant output stage, with a bus capacitor coupled to one of the half-bridges. The half-bridges, composed of lower voltage switches, are operated to supply power from a rectified line input in conjunction with a DC bus capacitor. The bus capacitor supplies power for only a portion of the input line voltage cycle, rather than for the entire operational time of the circuit.

Accordingly, the two half-bridge circuit configurations achieves bi-directional power flow through the load. Switches in the two half-bridges are controlled to draw a sinusoidal current from the line input to achieve a high power factor. Control of the switches in conjunction with the bus capacitor permits a charge to be placed on the bus capacitor in cycles, thereby providing constant power to the load.

According to an embodiment of the present invention, an input line side half-bridge, composed of two switches, operates to turn one switch on and off to obtain a sinusoidal current from the line input to supply current to the load. The second switch in the first half-bridge is turned on and off with an opposite duty cycle from that of the first switch to provide a recirculation path for bi-directional current flow. In the second half-bridge, one switch is operated to supply current to the load from the bus capacitor to maintain constant power delivered to the load. The other switch in the second half-bridge operates to provide a recirculation path to maintain bi-directional current flow in the circuit, while controlling the charging of the bus capacitor. In the second half-bridge, the first switch operates as a diode when it is turned off to assist in charging the bus capacitor under the control of the second switch.

According to another embodiment of the present invention, the switches in each half-bridge are switched with equal, complementary duty cycles. All switches are switched at substantially the same time, with the frequency of switch operation varying to adjust input current and output voltage.

BRIEF DESCRIPTION OF THE DRAWINGS

The invention is described in greater detail below with reference to the accompanying drawings, in which:

FIGS. 1A, 1B and 1C show conventional electronic ballast and power converter circuits;

FIG. 13A is a circuit diagram of a third embodiment of a lamp ballast according to the present invention;

FIG. 14A is a circuit diagram of a fourth embodiment of a lamp ballast according to the present invention.

DETAILED DESCRIPTION OF THE PREFERRED EMBODIMENTS

Figure 1C:
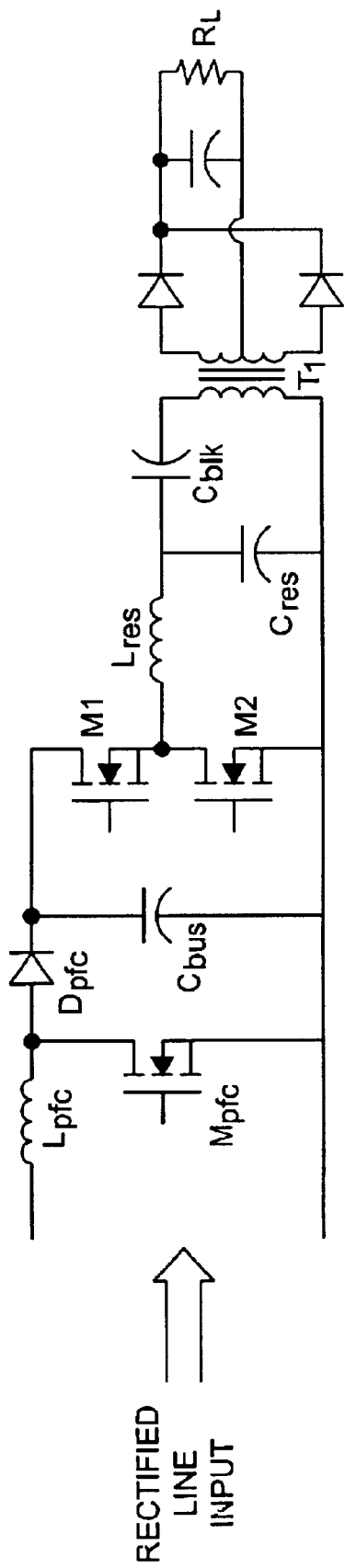
Figure 2A:
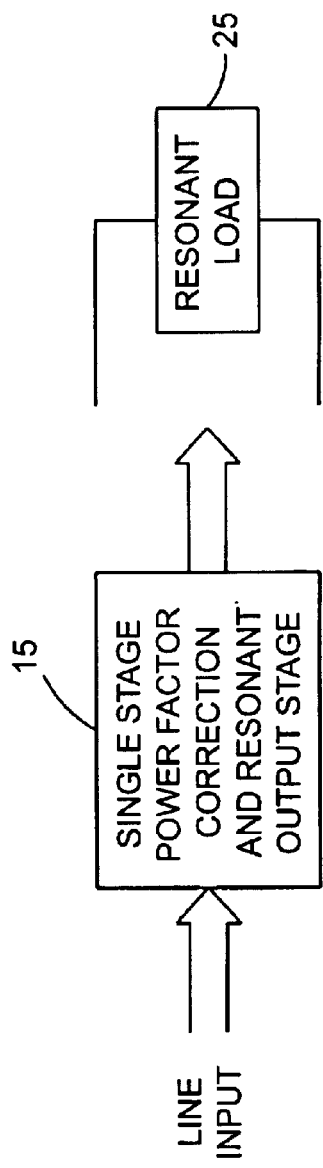
FIG. 2A is a diagram of a converter circuit according to the present invention.

Referring now to FIG. 2A, a block diagram of a circuit 15 according to the present invention is shown. In the configuration shown in FIG. 2A, circuit 15 is provided as a single stage power factor correction and resonant output circuit. Circuit 15 is used to provide power to resonant load 25. Circuit 15 combines power factor correction with a resonant output stage to provide constant power to load 25.

Figure 2B:
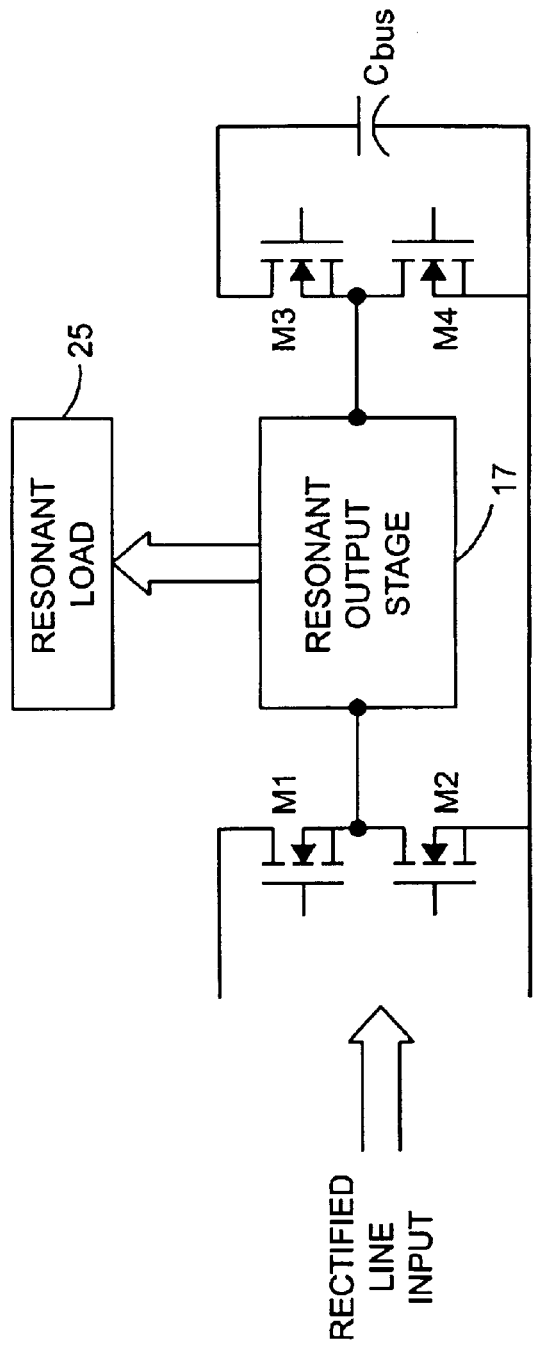
FIG. 2B is a generalized circuit diagram of the converter according to the present invention.

Referring now to FIG. 2B, further detail for the circuit 15 is shown. Circuit 15 includes two half-bridges composed of switches M1–M4. Switches M1–M4 are switched to provide power factor correction, while supplying constant power to resonant load 25. A resonant output stage 17 acts as a tank circuit to store and transfer energy that is delivered from the line input through the first half-bridge, and from a bus capacitor Cbus through the second half-bridge. Bus capacitor Cbus is separated from the input stage composed of a half-bridge made up of switches M1 and M2. Bus capacitor Cbus is accordingly accessible to the line input through switches M1 and M2 and resonant output stage 17. In this configuration, bus capacitor Cbus can have a very high ripple voltage, permitting the use of a non-electrolytic capacitor for bus capacitor Cbus. By using less expensive and more reliable types of capacitors other than electrolytic, the overall circuit reliability is improved at a lower cost, while improving maintainability. Operation of switches M1–M4 and the control goal for power delivery is discussed in greater detail below.

Figure 2C:
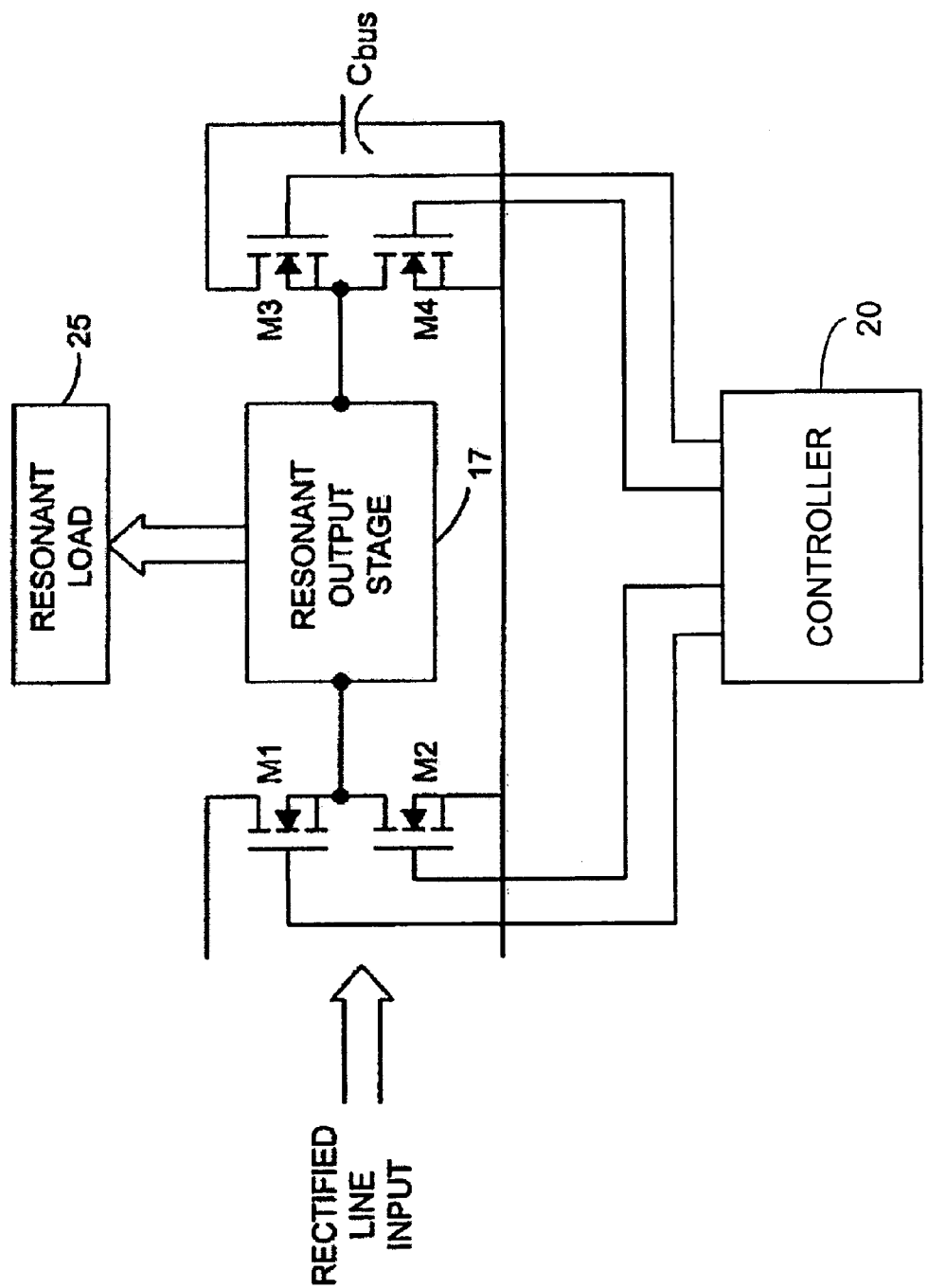
FIG. 2C is a generalized circuit diagram of the converter according to the present invention illustrating a controller connected to converter switches.

Referring now to FIG. 2C, a controller 20 is illustrated for driving switches M1–M4. Controller 20 realizes a control for the power converter, as described in greater detail below.

Figure 3:
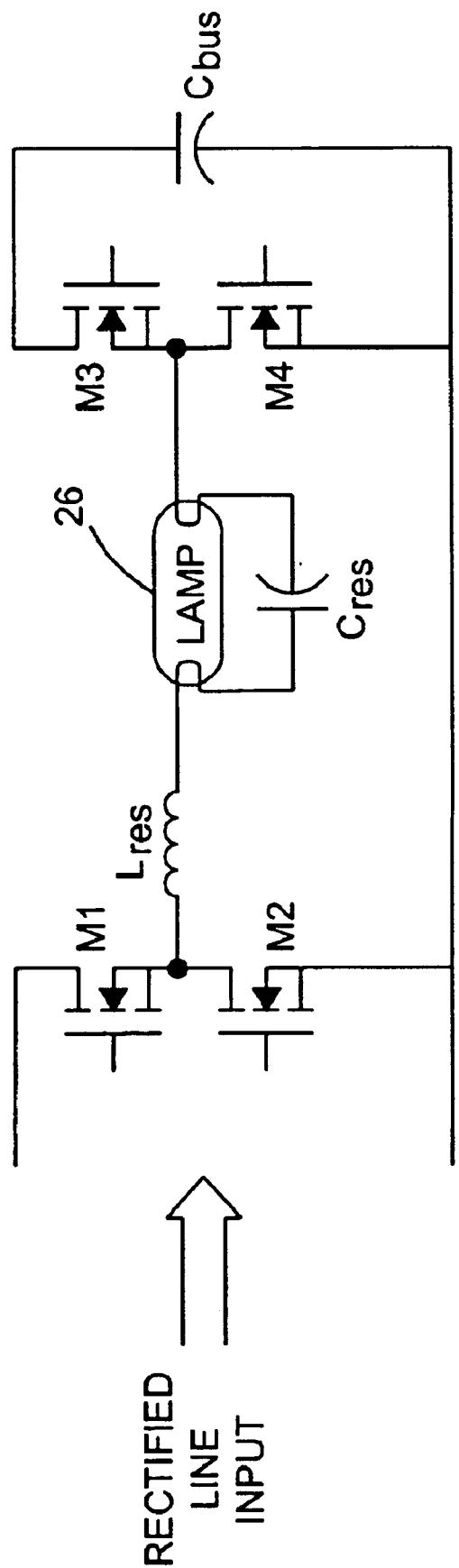
FIG. 3 is a circuit diagram of an electronic ballast circuit according to the present invention.

Referring now to FIG. 3, a circuit diagram according to the present invention is shown for circuit 15. A circuit diagram provides two half-bridges composed of two switches each. The switches used in the half-bridges are enhancement mode MOSFETs. A DC bus capacitor Cbus is connected in parallel with the half-bridge formed by switches M3, M4. By placing bus capacitor Cbus across the half-bridge formed by switches M3, M4, bus capacitor Cbus is separated from the rectified line input across the first half-bridge composed of switches M1, M2. A resonant output stage located between the two half-bridges is composed of Lres, Cres and lamp 26. An important feature of the present invention is that the resonant network can be replaced by a piezoelectric transformer equivalent. In addition, lamp 26 can be replaced by a resistive load, as is discussed in the case of an AC to DC converter, discussed in more detail below.

The circuit shown in FIG. 3 permits bi-directional power flow through the load. For example, when the rectified line input voltage is higher than a voltage across bus capacitor Cbus, power flows from the rectified line input to the load. When the rectified line input voltage drops below the voltage across bus capacitor Cbus, bus capacitor Cbus supplies power to the load. Accordingly, bus capacitor Cbus supplies power to the load for a portion of the input line voltage cycle.

By appropriately controlling switches M1, M2, M3 and M4 the line current drawn from the rectified line input takes on a sinusoidal form in phase with the line voltage to provide a high power factor. Appropriate control of switches M1–M4 also permits bus capacitor Cbus to be charged, and thereby provides a constant power to the load. In the configuration shown in FIG. 3, switches M1 and M3 are operated to supply appropriately switched current to the load to maintain constant load power. Switch M1 in particular is operated to control the current drawn from the rectified line input so that the current drawn is sinusoidal in shape. Switches M2 and M4 provide current recirculation paths to maintain bi-directional current flow in the electronic ballast circuit. Switch M4 in particular operates in conjunction with switch M3 in an off state to charge bus capacitor Cbus. A body diode is formed by switch M3 in an off position to assist in maintaining a charge across bus capacitor Cbus.

Figure 4:
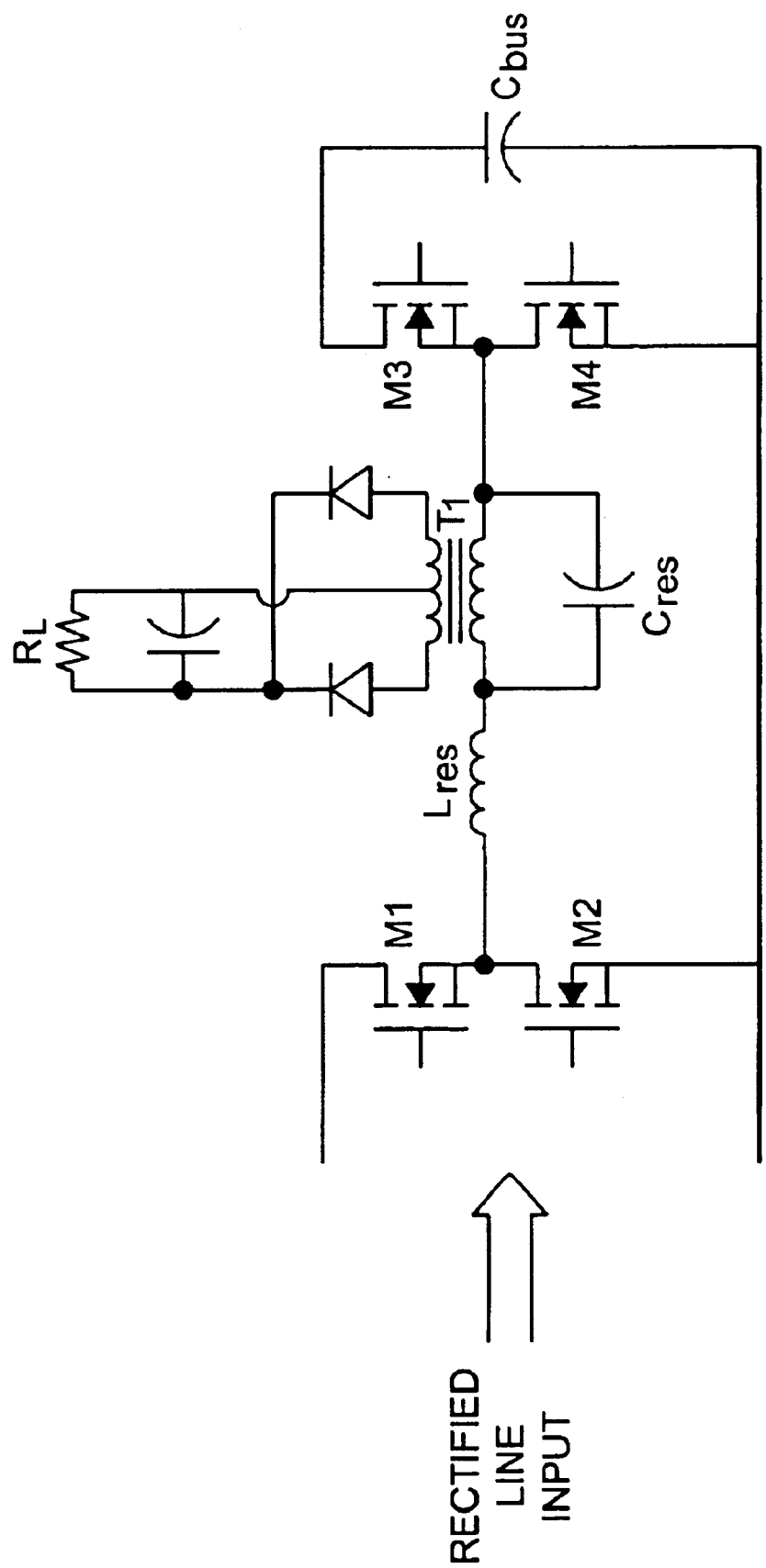
FIG. 4 is a power converter circuit according to the present invention.

Referring now to FIG. 4, an AC to DC power converter is shown with a two half-bridge configuration that is similar to the circuit provided in FIG. 3. In this embodiment of the present invention, transformer T1 and load resistor $R_L$ take the place of gas discharge lamp 26. As with the electronic ballast circuit of FIG. 3, the power converter of FIG. 4 maintains constant power to the load while drawing a sinusoidal current from the rectified line input. Switches M1 and M3 supply current to the load from the rectified line input and bus capacitor Cbus, respectively. Switches M2 and M4 provide current recirculation paths to permit bi-directional current flow in the circuit. Switch M4 in particular is used to control charging of bus capacitor Cbus in conjunction with the body diode of switch M3.

A control scheme for switching switches M1–M4 varies depending on design goals. One design approach is to seek to obtain constant power delivered to the resonant load, whether gas discharge lamp, transformer or other resonant topologies. With this approach, high power factor is obtained by drawing a sinusoidal input current from the rectified line input.

Figure 5:
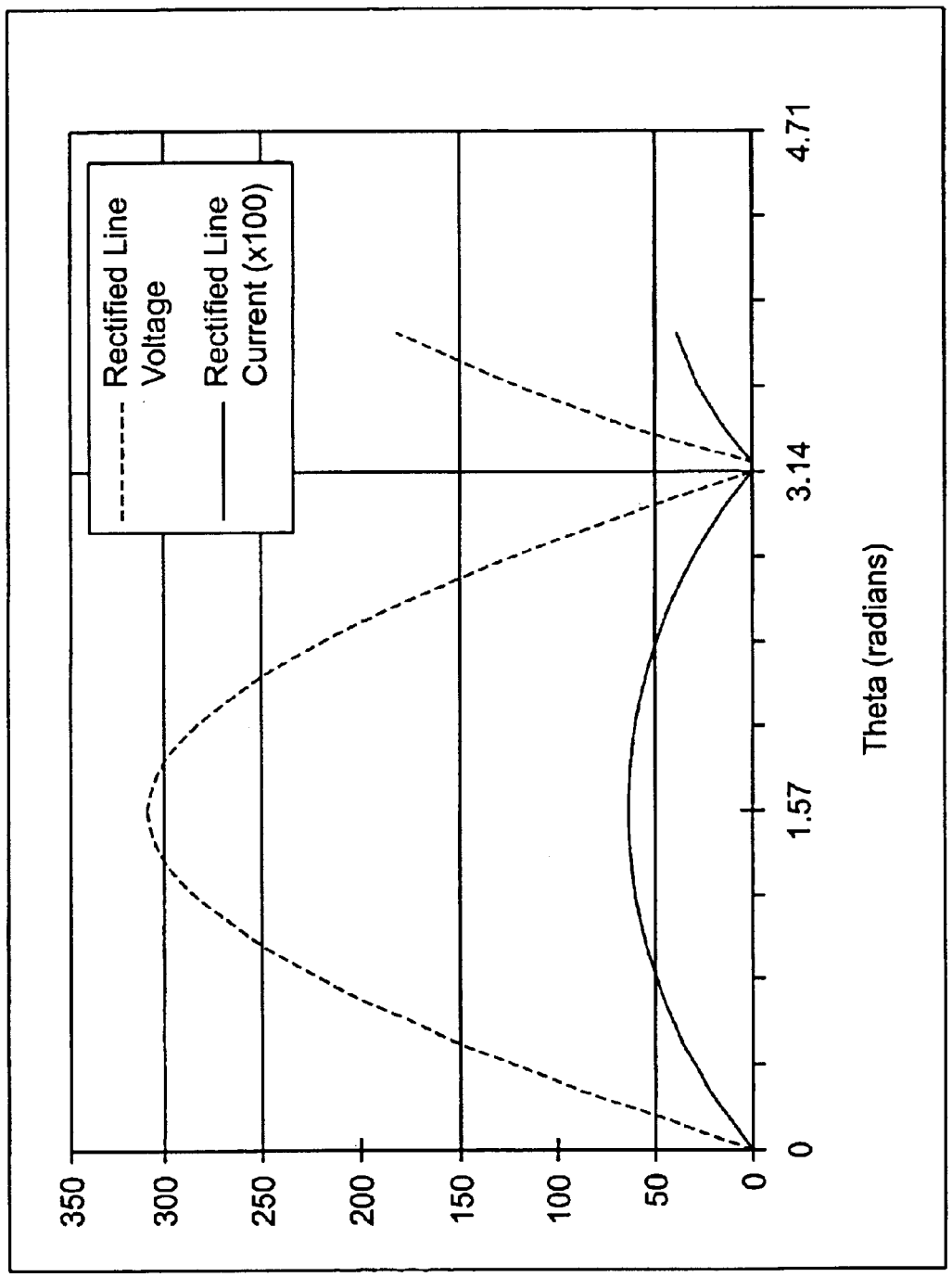
FIG. 5 is a chart showing line voltage and current according to the present invention.

Referring now to FIG. 5, a graph showing rectified line input voltage and current is plotted against an angular reference. As can be seen from the graph in FIG. 5, the input line voltage and current are both sinusoidal and in phase. The in-phase operational characteristics of the input line voltage and current causes the circuit to appear as a resistive load to the line input voltage, thereby providing a high power factor. Input power is obtained by multiplying the input voltage and current together and is given as $$P_{input} = P_{load}(1 - \cos 2\theta)$$

To achieve constant power delivered to the load, the power supplied by bus capacitor Cbus is obtained by subtracting the load power from the input power.

$$P_{capacitor} = P_{load} - P_{input}$$

$$P_{capacitor} = P_{load} - P_{load}(1 - \cos 2\theta) = P_{load} \cos 2\theta$$

Figure 6:
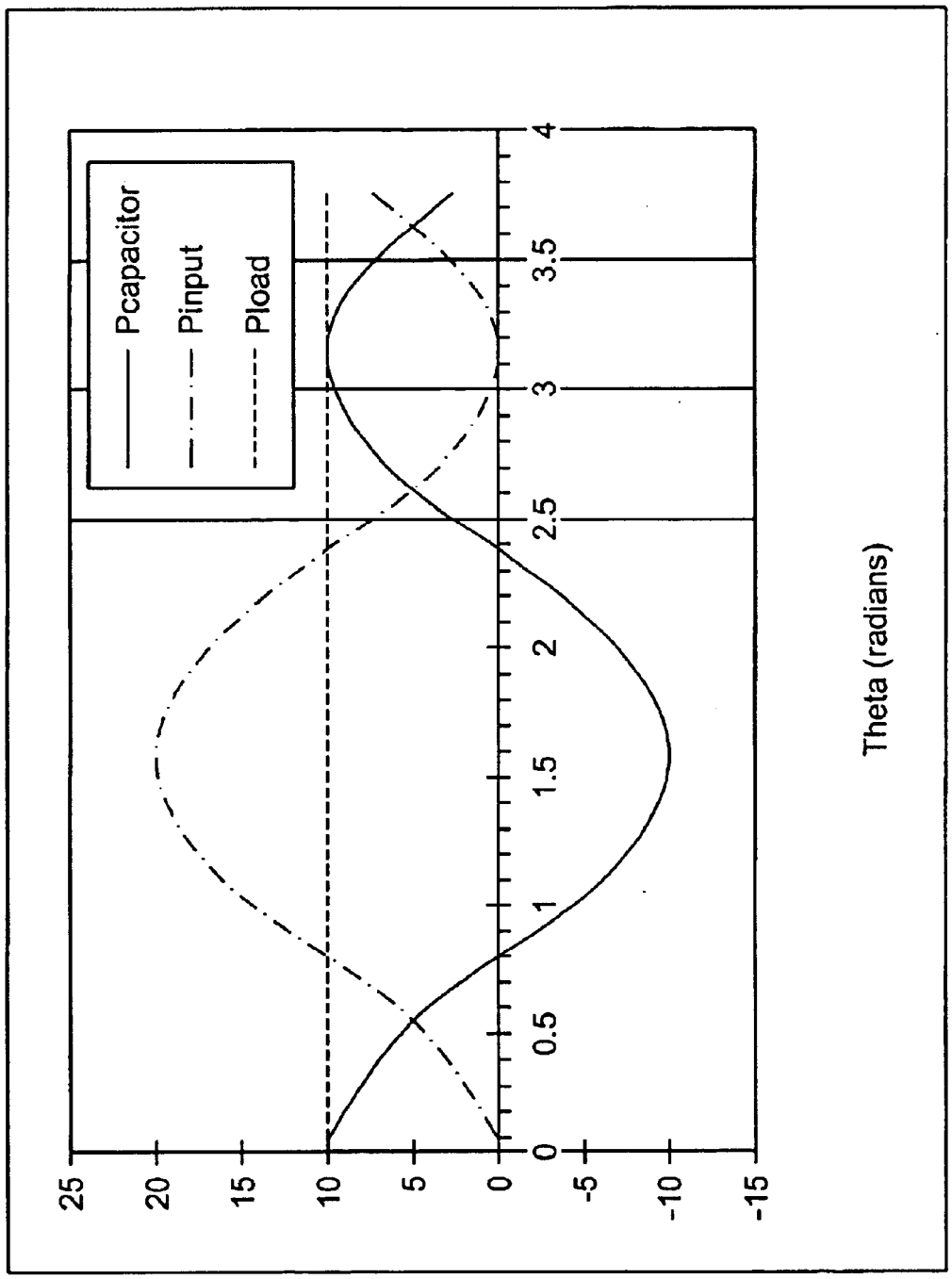
FIG. 6 is a graph showing power delivery according to the present invention.

The input power, load power and capacitor power are plotted against an angular reference in FIG. 6. The graph of FIG. 6 provides a simple illustration of dynamically changing power observed at particular points of the circuit over a complete cycle of the input line voltage. To obtain the capacitor voltage as a function of the load power and capacitance with initial conditions, the following equation is given.

$$V_{capacitor} = \frac{V_{capacitor(t=0)} - P_{load} \cos 2\theta}{V_{capacitor(t=0)} \cdot C}$$

The capacitor current can then be obtained by dividing the capacitor power by the capacitor voltage.

$$I_{capacitor} = \frac{P_{load} \cos 2\theta}{V_{capacitor}}$$

Figure 7:
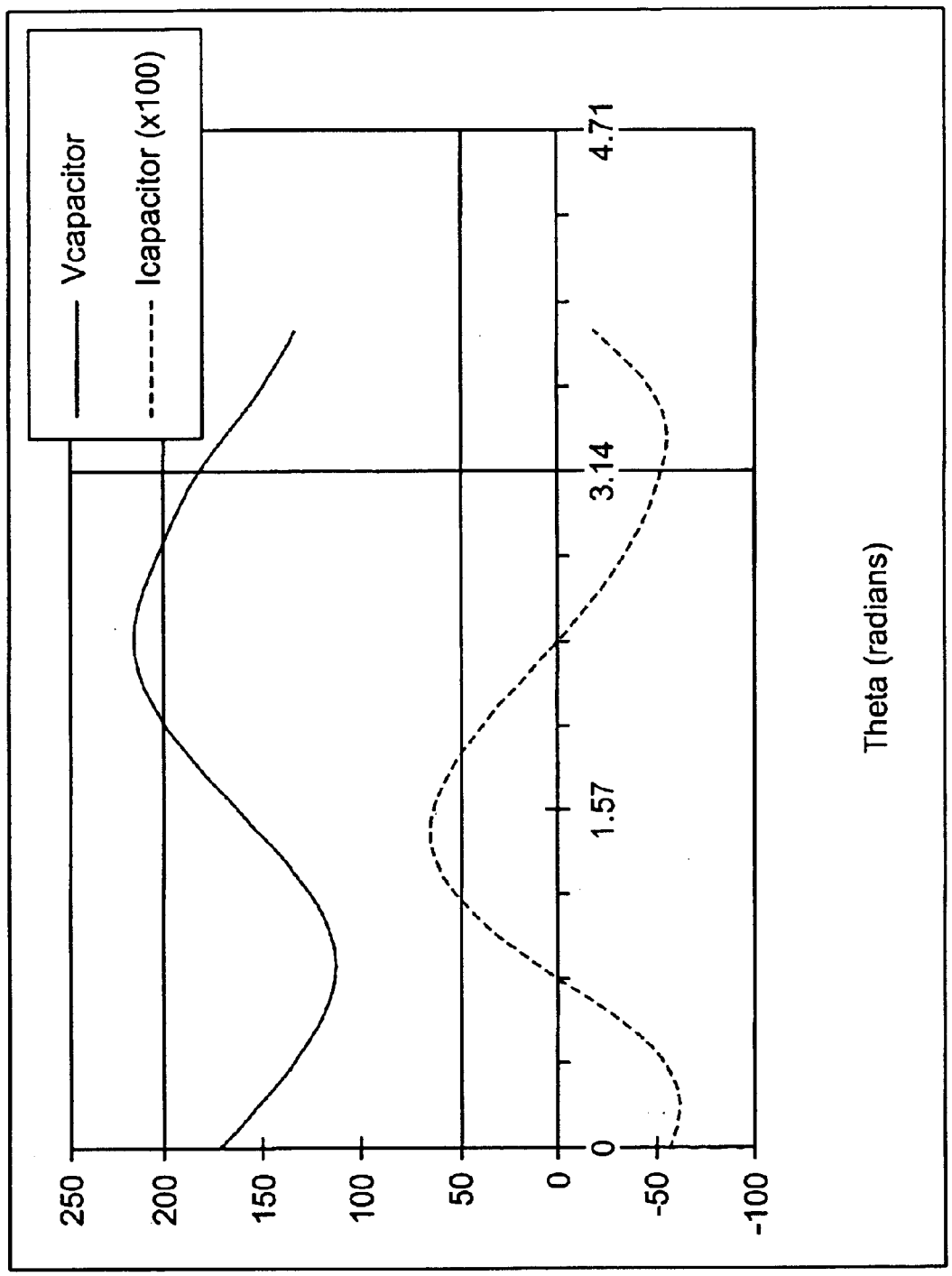
FIG. 7 is a graph showing current and voltage for a bus capacitor according to the present invention.

The capacitor voltage and current can then be plotted to show how they change dynamically over a complete cycle of the input line voltage. FIG. 7 shows the capacitor voltage and current plotted against an angular reference. With the capacitor voltage and current, the conduction angle of switches M1 and M3, given as $\alpha$ and $\beta$ can now be solved. The conduction angles are provided with respect to a complete load current cycle, which has a much higher frequency than that of the input line current. The conduction angle of switch M1 is related to the instantaneous line input current and the average high frequency load current as follows:

$$\alpha = \frac{360}{2\pi} \left\{ \arccos\left( \frac{-2\pi P_{load}(1 - \cos 2\theta)}{|V_{in_{peak}} \cdot \sin\theta| \cdot i_{load}} + 1 \right) \right\}$$

The conduction angle for switch M3 is related to power observed on bus capacitor Cbus and the average high frequency load current, as follows:

$$\beta = \frac{360}{2\pi} \left\{ \arccos\left( -2\pi \left| \frac{P_{load} \cos 2\theta}{\left( V_{capacitor(t=0)} - \frac{P_{load} \cos 2\theta}{V_{capacitor(t=0)} \cdot C} \right) i_{load}} \right| + 1 \right) \right\}$$

Figure 8:
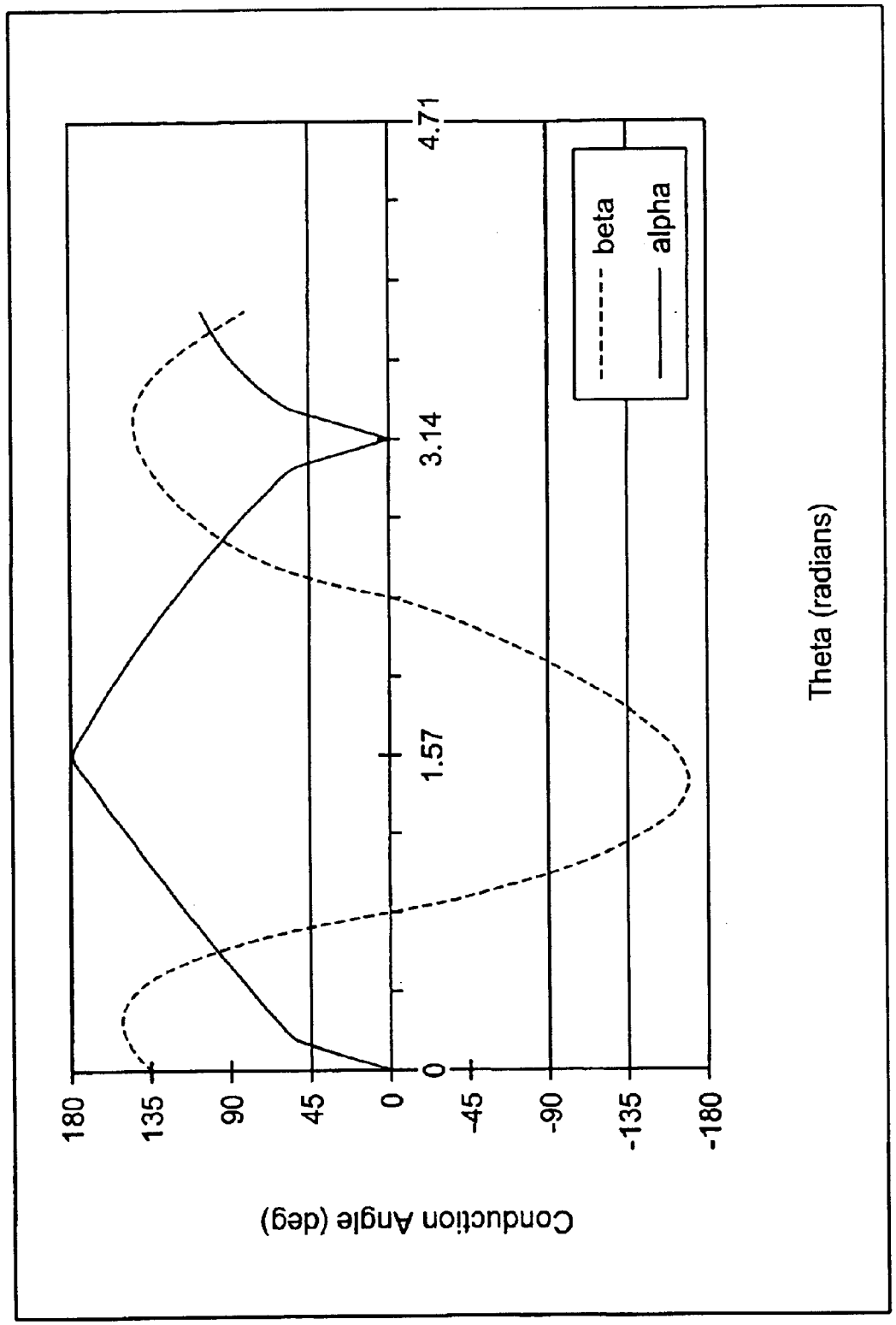
FIG. 8 is a graph showing conduction angles for current controlling switches according to the present invention.

A plot of the conduction angles $\alpha$ and $\beta$ is shown in FIG. 8. As can be seen from FIG. 8, both conduction angles change dynamically over a complete cycle of the input line voltage for a typical line input voltage, load power, capacitor voltage and capacitor value for the bus capacitor Cbus.

Use of the control scheme described above provides constant power to the load while maintaining a high power factor. However, implementation of this control can be somewhat complicated. A simplified control can be obtained by taking a different design approach with different design goals.

One such alternative design approach focuses on control techniques for simultaneously controlling the output voltage of the resonant circuit and the input current from the like input. According to this approach, the output voltage is regulated and the input current is shaped as a sinusoidal wave. This control technique involves the use of frequency control to regulate output voltage, and phase shift control between the two half-bridges for input current waveform shaping.

According to this control scheme, switches M1 and M2 are alternately switched on and off with each other so that at least one of switches M1, M2 is always conducting. Similarly, switches M3 and M4 are alternately turned on and off so that at least one of switches M3, M4 is always conducting. In addition, the two switches in each of the half-bridges have a complementary 50% duty cycle ratio. Switches M1–M4 are switched at the same switch frequency, which is made variable for output voltage control. The phase between the two half-bridges is adjusted for input current control. Accordingly, switches M1–M4 are operated to control two variables in the circuit, namely output voltage and input current. The phase shift control is determined by a phase difference between the two half-bridges.

Figure 9A:
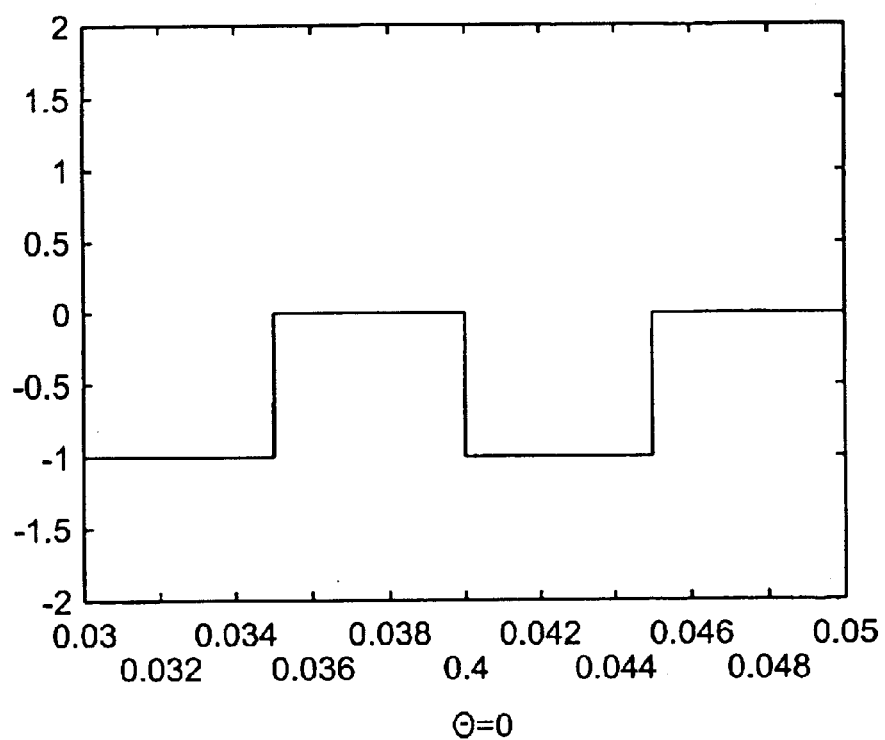
FIGS. 9A–9C show a normalized output voltage plot for a bus voltage greater than an input voltage at different input cycle portions.

Referring now to FIG. 9A, a plot of the phase for normalized output voltage is shown. The bus voltage Vbus across bus capacitor Cbus is normalized to 1 in this analysis for the sake of ease. As can be seen in FIG. 9, output voltage ranges from −1 to 0 in equal duty cycles when Vbus is greater than the input line voltage Vinput.

Figure 9B:
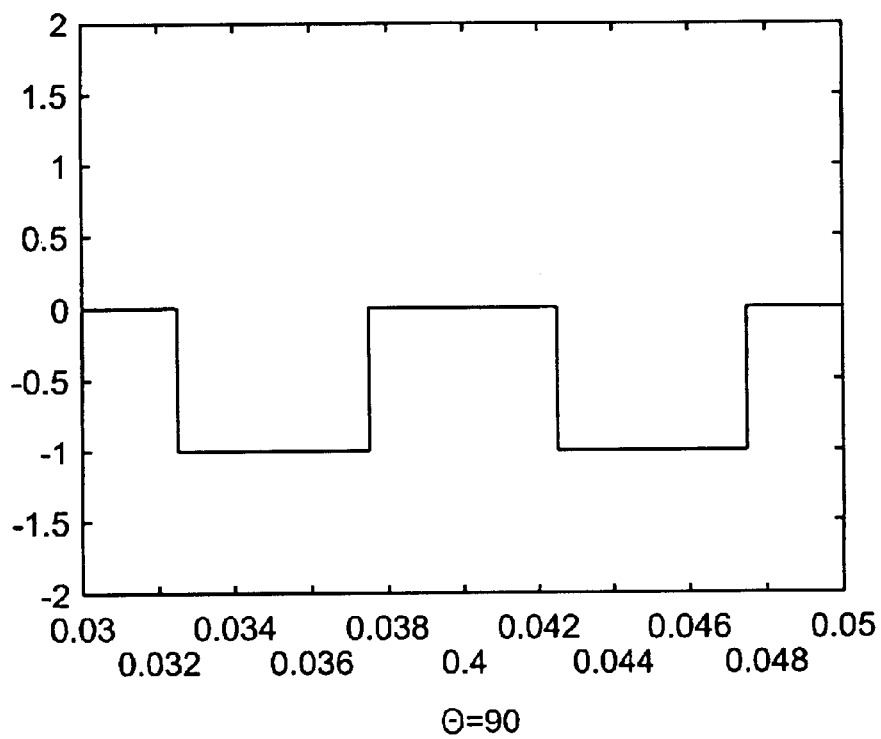
Figure 9C:
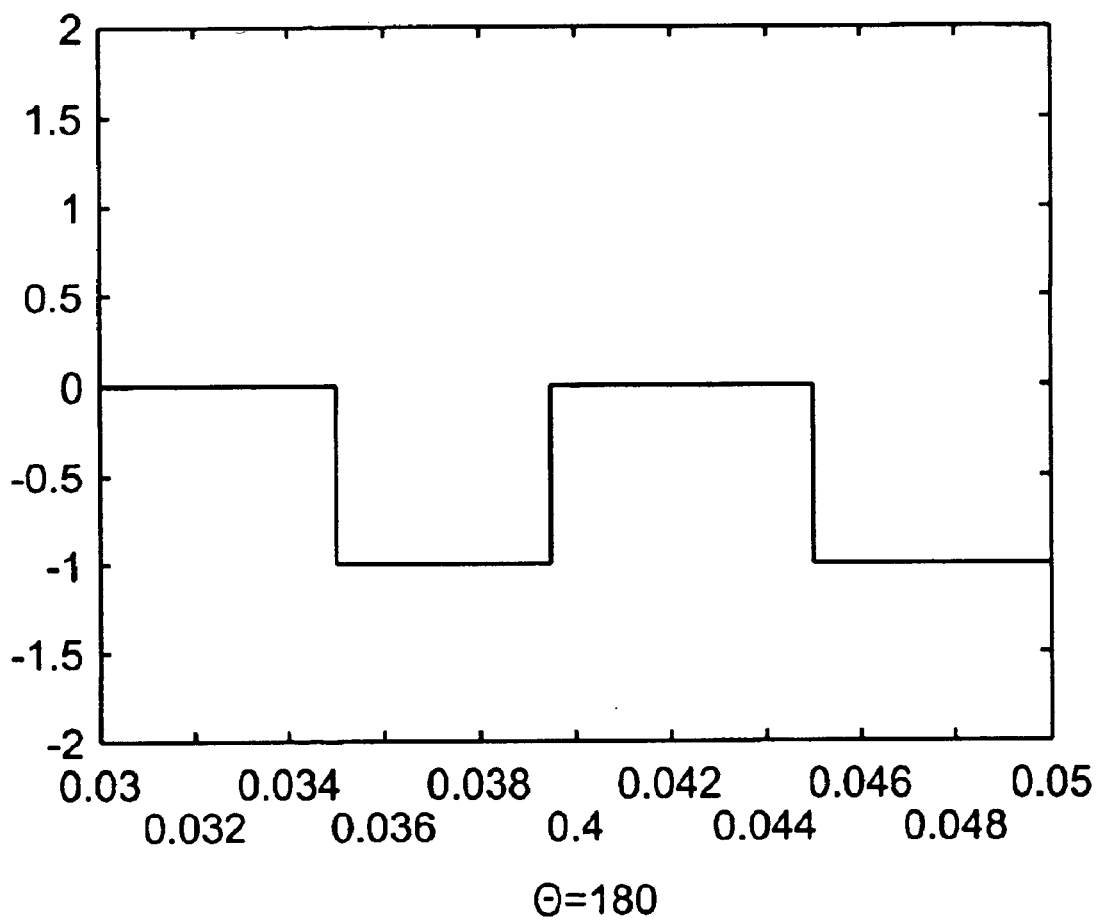

In FIG. 9B, the switch cycle is shifted in phase as the power line input moves through 90° of a full cycle. Again, the duty cycle is 50% as the half-bridges switch power at equal frequencies.

Figure 10A:
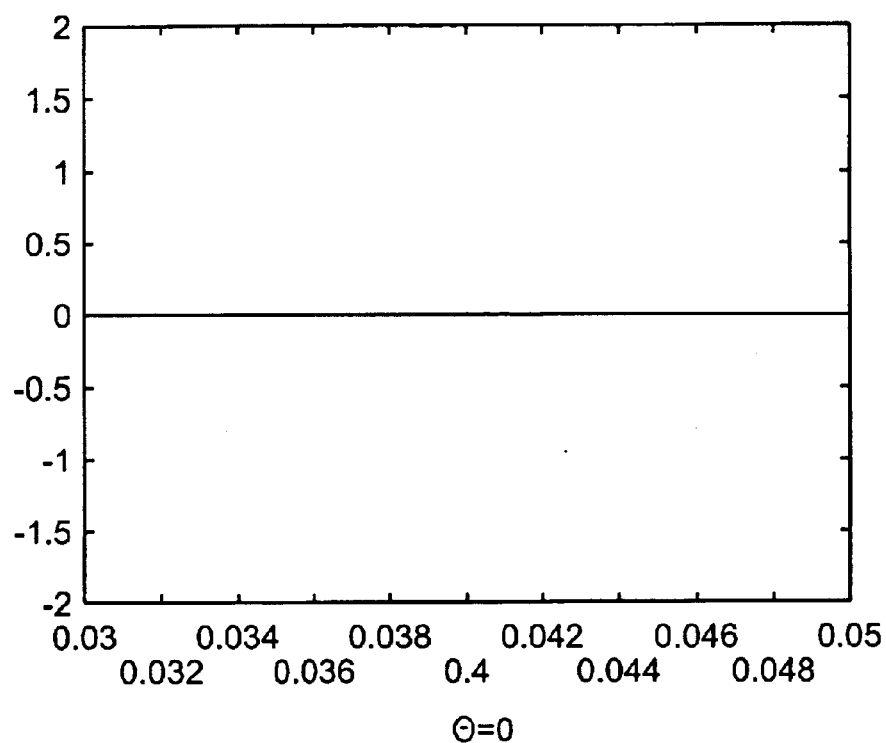
FIGS. 10A–10C show a normalized output voltage plot for a bus voltage equal to an input voltage at different input cycle portions.

Referring now to FIG. 10A, the case in which the input line voltage Vinput is equal to Vbus. In this instance, the voltage across the load at the beginning of a power line input cycle is zero (0).

Figure 10B:
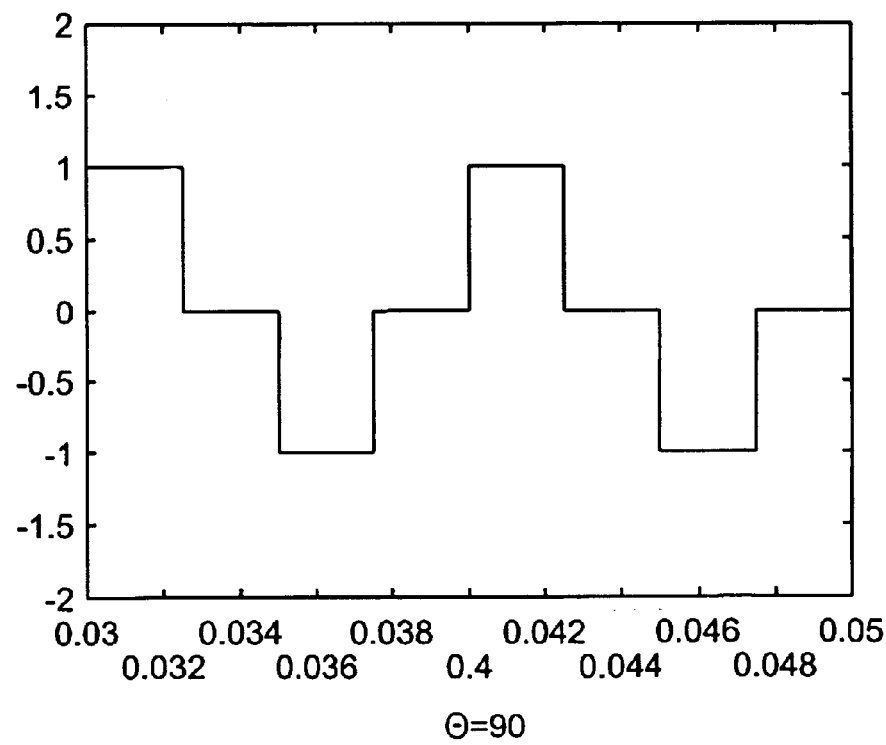

In FIG. 10B, Vinput=Vbus and the power line input signal is at 90° of a full cycle. As can be seen in FIG. 10B, the output voltage varies between 1 and −1, with equal cycle portions at zero (0) voltage.

Figure 10C:
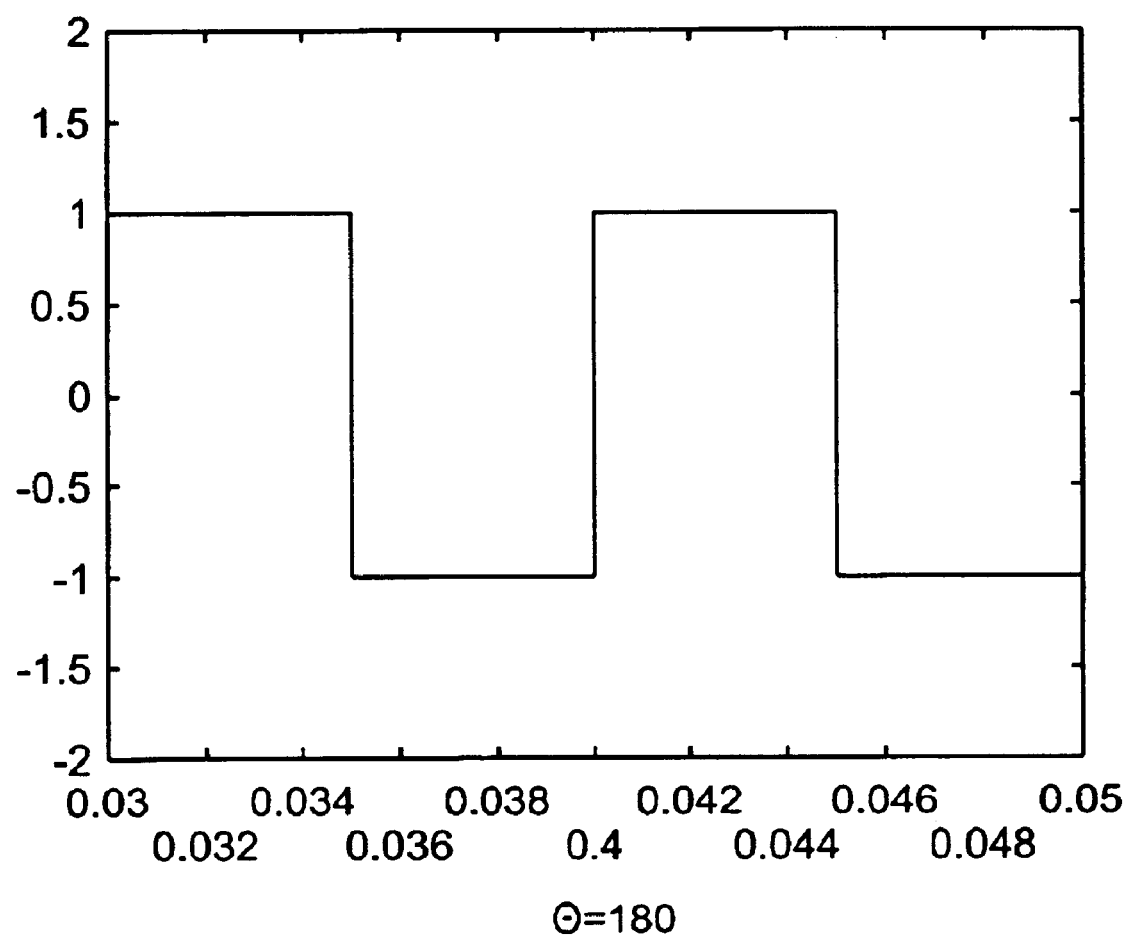

In FIG. 10C, as the power line input signal moves through 180° of a full cycle, the zero voltage output portions are eliminated. The output voltage varies directly between 1 and −1 in this case where Vinput=Vbus.

Figure 11A:
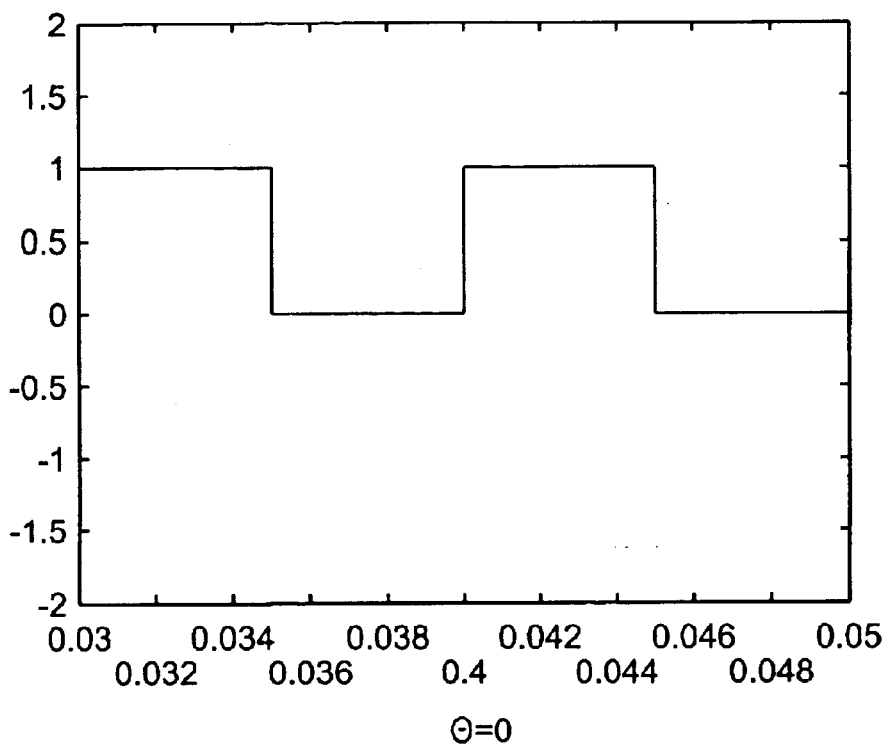
FIGS. 11A–11C show a normalized output voltage plot for a bus voltage less than an input voltage at different input cycle portions.

Referring now to FIG. 11A, the output voltage where Vinput is greater than Vbus is illustrated for the beginning of a power line input cycle. As FIG. 11A shows, the output voltage varies between 1 and zero (0) in equal duty cycles.

Figure 11B:
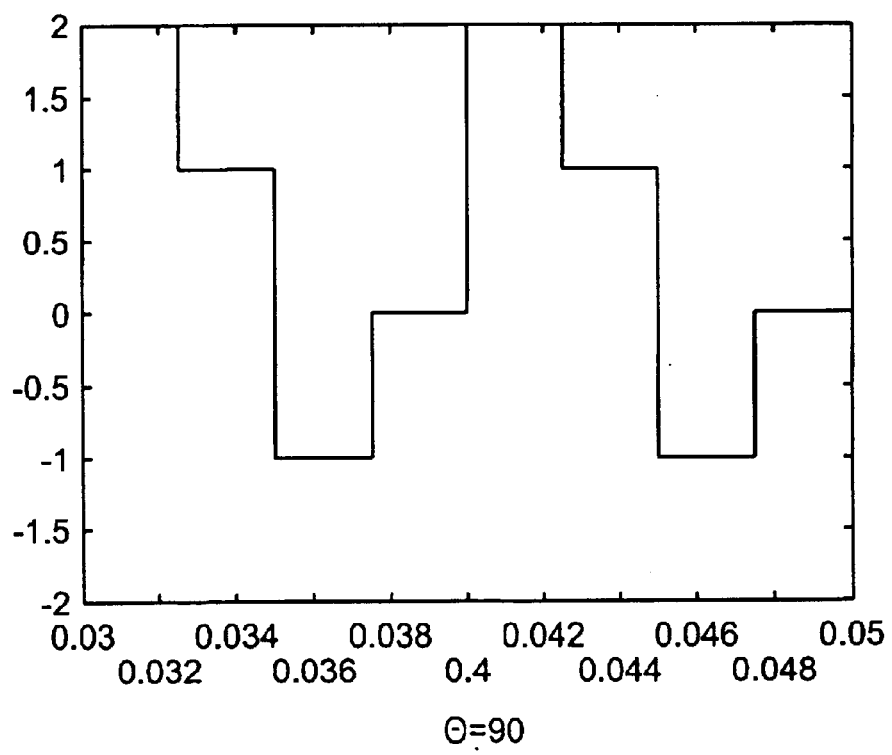

In FIG. 11B, the power line input moves through 90° of a full cycle. As power is transferred from the line input to the resonant output, the output voltage changes from the line input voltage 2, to the line input voltage minus the bus voltage, to the bus voltage and finally to zero, withe the cycle repeating. Again, the switches are operated at the same frequency with offset switching times.

Figure 11C:
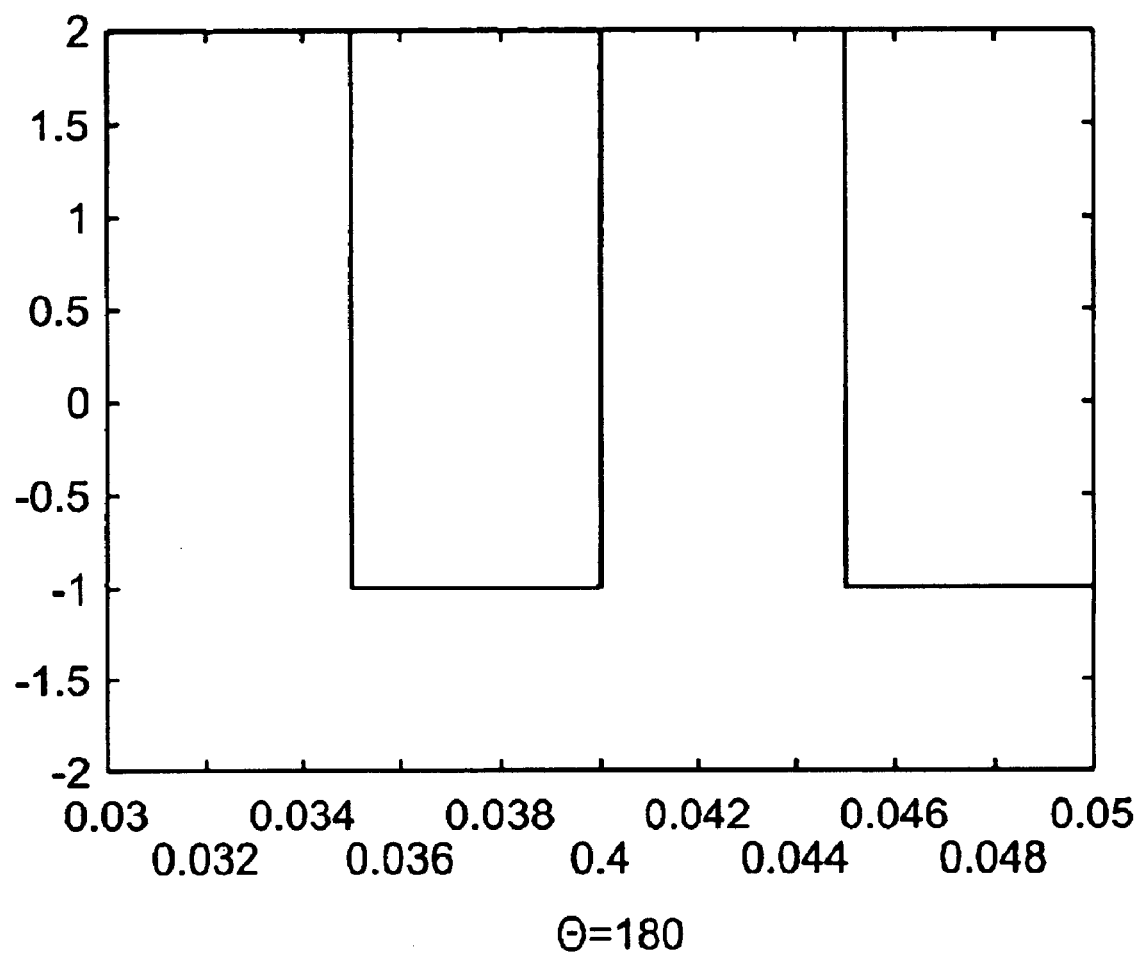

In FIG. 11C the power line input moves through 180° of a full cycle and an equal duty cycle is readily observed. As power continues to be transferred from the line input to the resonant output, the output voltage varies between the line input voltage 2 and the bus voltage −1.

As can be readily observed from FIGS. 9–11, a phase shift between the two half-bridges shapes the input current from the line input to provide a high power factor. At the same time, output voltage from the resonant output stage is regulated to provide constant power to the load.

Figure 12A:
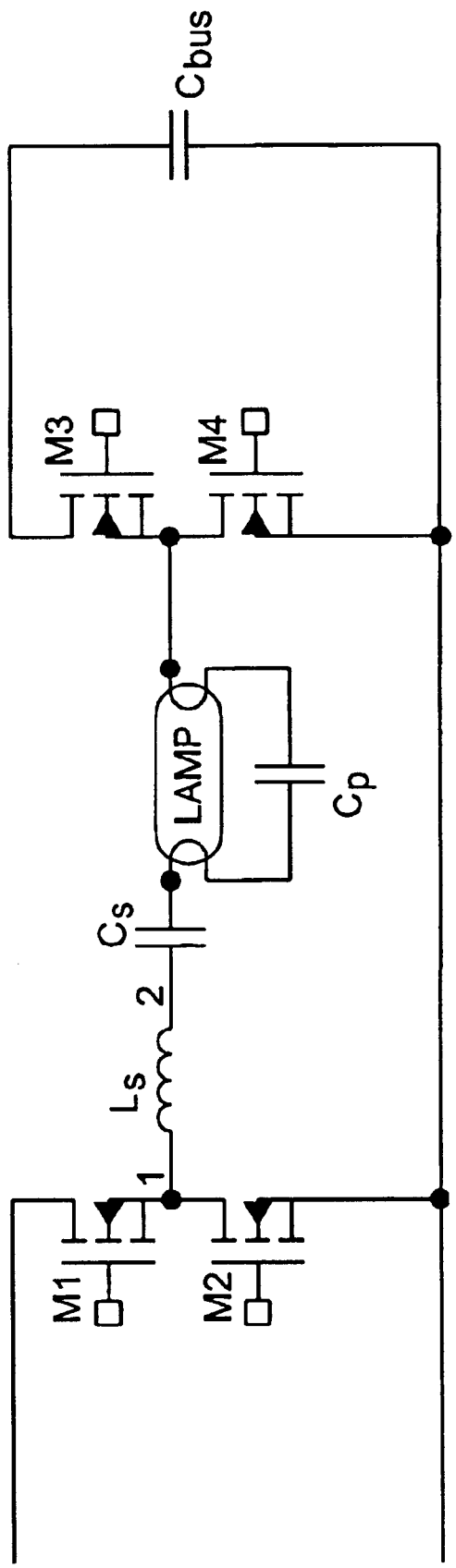
FIG. 12A is a circuit diagram of an embodiment of a lamp ballast according to the present invention.
Figure 12B:
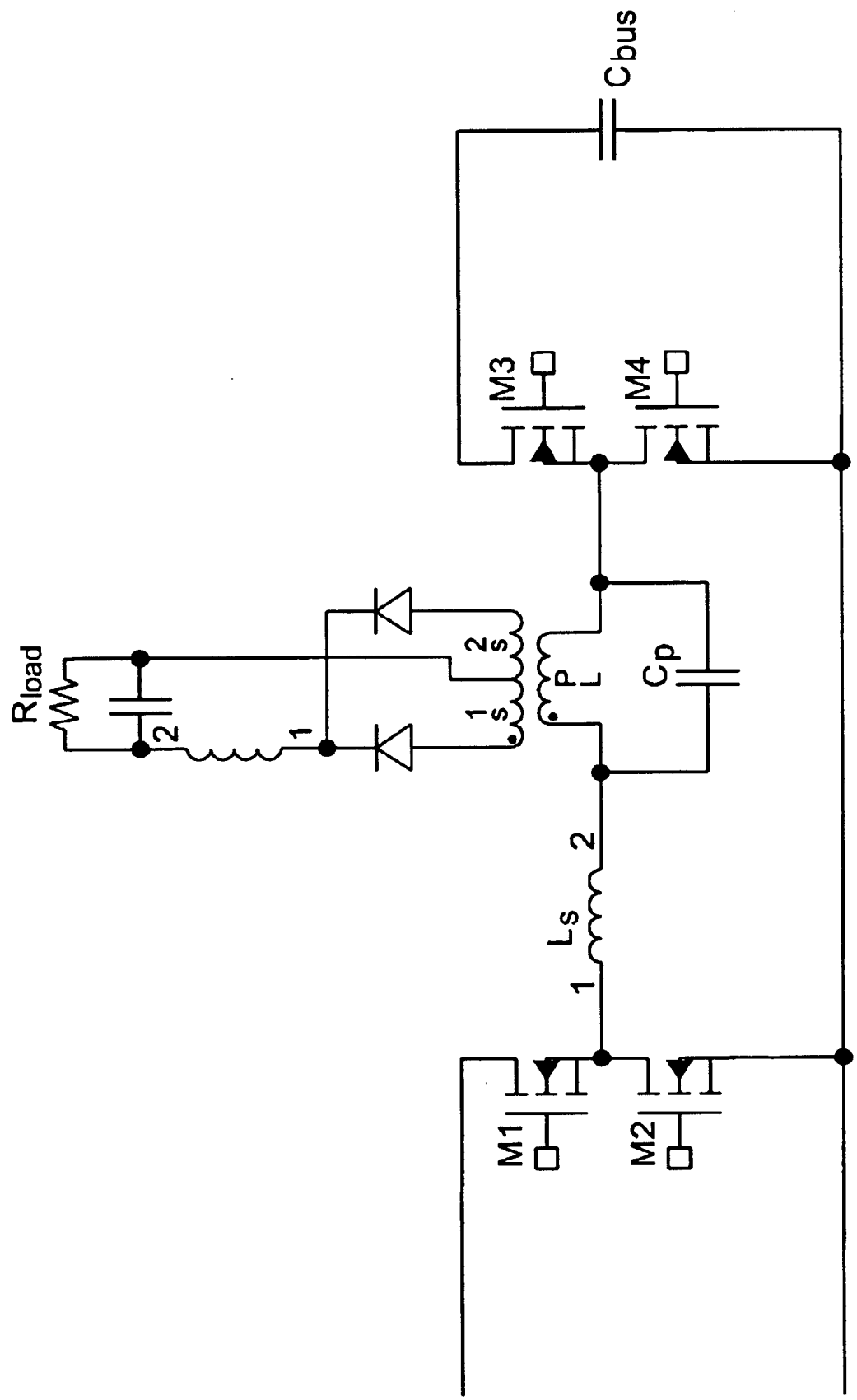
FIG. 12B is a circuit diagram of an embodiment of a power converter according to the present invention.
Figure 13:
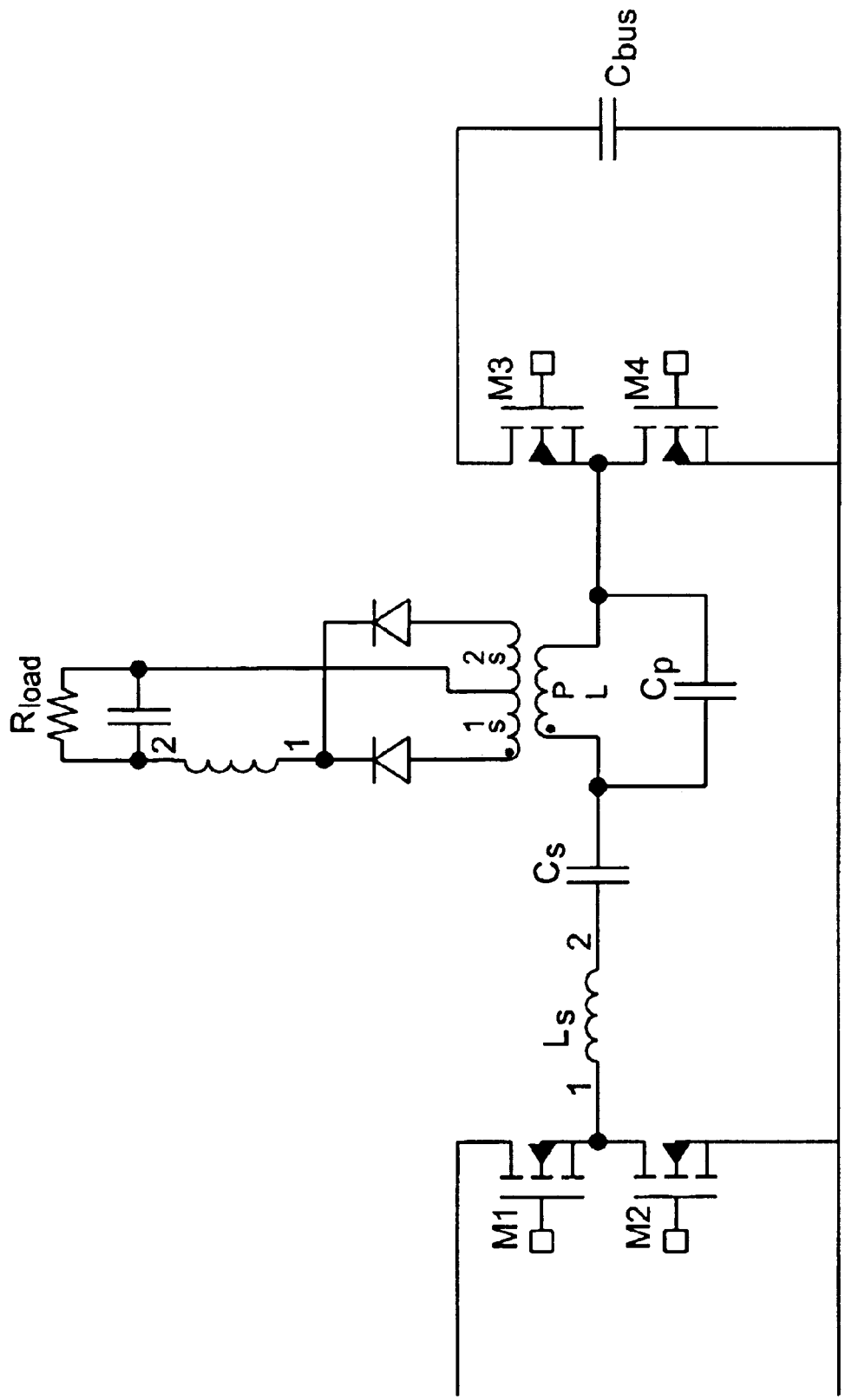
FIG. 13 is a circuit diagram of a second embodiment of a power converter according to the present invention.
Figure 14:
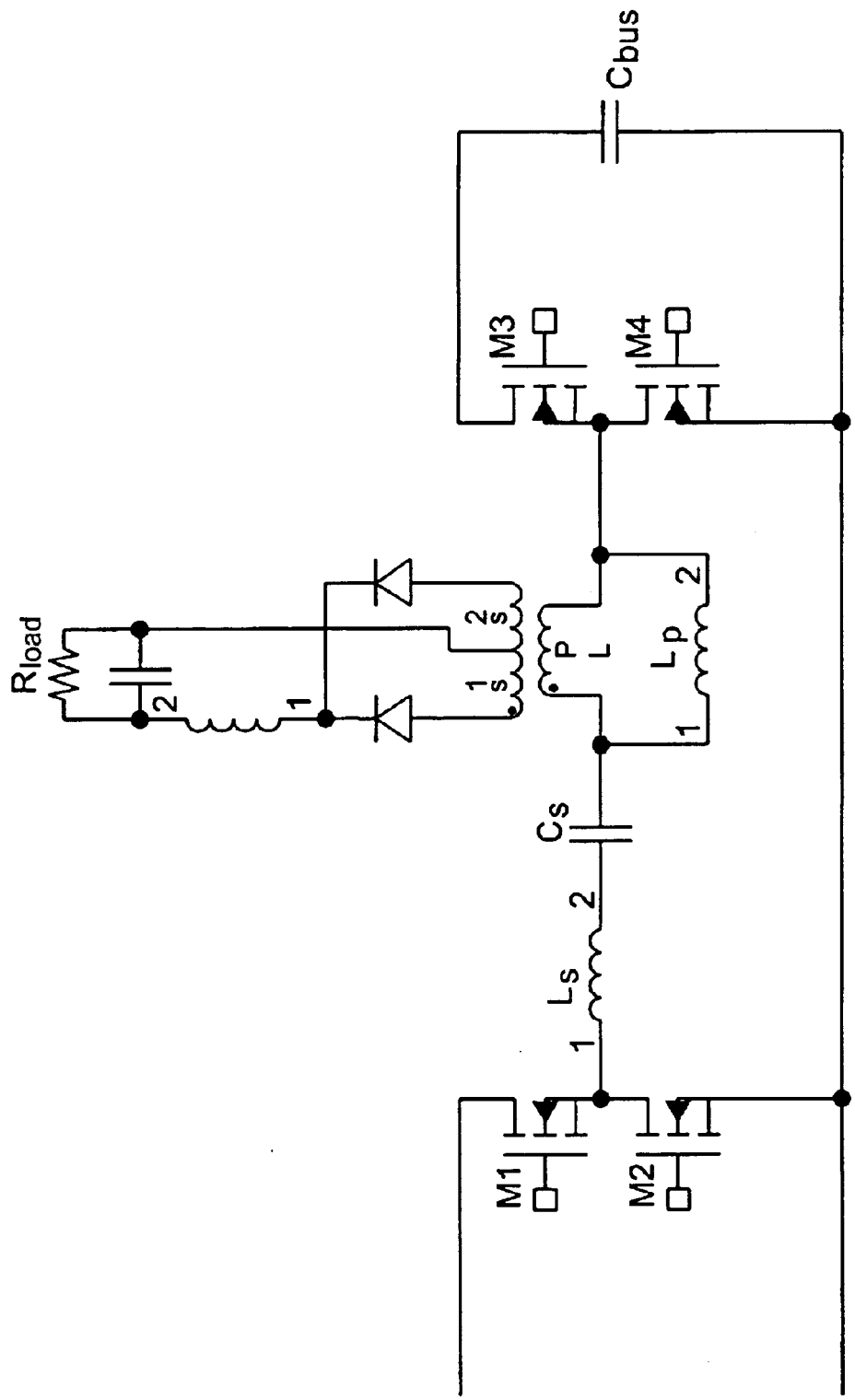
FIG. 14 is a circuit diagram of a third embodiment of a power converter according to the present invention.

Several further resonant output stages are illustrated in FIGS. 12–14 showing various converter embodiments. FIGS. 12A and 12B show a parallel connected tank circuit for a gas discharge lamp load and a transformer-resistive load, respectively. FIG. 13 shows a series combination of an inductor Ls, a capacitor Cs and a capacitor Cp to form the resonant circuit for a power converter load. FIG. 14 shows a series combination of inductor Ls, capacitor Cs and inductor Lp to form the resonant circuit for a power converter load.

The present invention has been shown and described with reference to operation of a power convertor and a gas discharge lamp. However, other variations and operation of the circuit should be apparent. For example, loads with resonant component topologies can be accommodated by the circuit of the present invention to provide an integrated general purpose power converter. Such a circuit is suitable for use with fluorescent lamp ballasts, high intensity discharge (HID) lamp ballasts and AC to DC power converters. The resonant networks shown and described according to the present invention can also be replaced by equivalents, such as a piezoelectric transformer equivalent.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A power converter circuit comprising:

a first switch connected to a circuit input;

a second switch connected to a voltage storage device;

the first and second switches being connected in series with a resonant output circuit;

the resonant output circuit being operable to drive a resonant load; and a control circuit coupled to the first and second switches and being operable to drive the first and second switches to achieve constant power in the resonant load, the first and second switches being driven in accordance with calculated conduction angles.

2. The power converter circuit of claim 1, wherein the calculated conduction angles are given by the equation:

$$\alpha = \frac{360}{2\pi}\left\{\arccos\left(\frac{-2\pi P_{load}(1-\cos 2\theta)}{|V_{in_{peak}} \cdot \sin\theta| \cdot i_{load}} + 1\right)\right\}$$

for the first switch and the equation:

$$\beta = \frac{360}{2\pi}\left\{\arccos\left(-2\pi \left|\frac{P_{load}\cos 2\theta}{\left(V_{capacitor(t=0)} - \frac{P_{load}\cos 2\theta}{V_{capacitor(t=0)} \cdot C}\right) i_{load}}\right| + 1\right)\right\}$$

for the second switch.

3. The power converter circuit according to claim 1, wherein the control circuit is further operable to drive the first switch to draw sinusoidal current in phase with an input voltage from said circuit input.

4. A method for controlling a power converter circuit having two switches, one switch being connected to a power line input, another switch being connected to a bus capacitor, the switches being in series with a resonant output circuit, the method comprising:

driving the one switch to have a conduction angle α according to the equation:

$$\alpha = \frac{360}{2\pi}\left\{\arccos\left(\frac{-2\pi P_{load}(1-\cos 2\theta)}{|V_{in_{peak}} \cdot \sin\theta| \cdot i_{load}} + 1\right)\right\}$$

and driving the other switch to have a conduction angle β according to the equation:

$$\beta = \frac{360}{2\pi}\left\{\arccos\left(-2\pi \left|\frac{P_{load}\cos 2\theta}{\left(V_{capacitor(t=0)} - \frac{P_{load}\cos 2\theta}{V_{capacitor(t=0)} \cdot C}\right) i_{load}}\right| + 1\right)\right\}$$

wherein θ is an angular reference of related to a cycle of the power line input.

* * * * *